Aug. 22, 1967  H. D. BAUMAN  3,337,359
WHITE PIGMENT
Filed Feb. 18, 1964
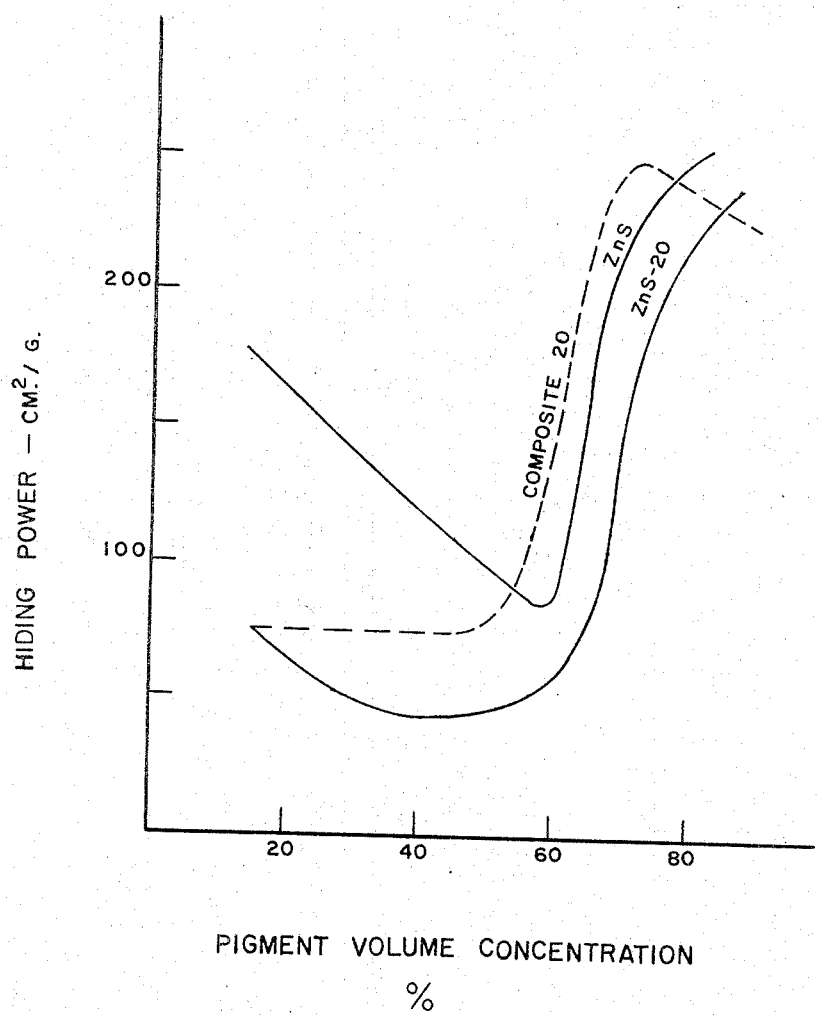
Harry D. Bauman, INVENTOR.
BY Fisher, Christen
Sabol & Caldwell

United States Patent Office 3,337,359
Patented Aug. 22, 1967

3,337,359
WHITE PIGMENT
Harry D. Bauman, Glen Rock, Pa., assignor to P. H. Glatfelter Company, Spring Grove, Pa., a corporation of Pennsylvania
Filed Feb. 18, 1964, Ser. No. 345,617
11 Claims. (Cl. 106—293)

This invention relates to the production of composite inorganic pigments having marked advantages in hiding power and simplicity of manufacture. Specifically, the invention relates to the production of a pigment comprising a coprecipitate of calcium carbonate and zinc sulfide from a solution containing a soluble metallic sulfide, such as sodium sulfide, and a soluble carbonate, such as sodium carbonate.

Of particular advantage is the fact that in accordance with the invention, the conventional recovery system of a kraft pulp mill can be utilized to produce a high quality pigment with a minimum of additional capital investment. This process provides a simple and practical method for the manufacture of a composite pigment of high hiding power and excellent characteristics for use as a filler in paper or a component in coating formulations, e.g., paints, and employs largely the facilities and processes utilized in the recovery of pulping chemicals, thereby affording great economic advantage to the pulp and paper industry.

By the well known technology of the kraft pulping and recovery systems, a green liquor is produced comprising a solution of sodium carbonate and sodium sulfide, and containing lesser amounts of sodium hydroxide and sodium sulfate. Normally the green liquor is causticized by the addition of lime to convert most of the sodium carbonate to sodium hydroxide and produce kraft white liquor which is essentially a solution of sodium hydroxide and sodium sulfide with smaller amounts of sodium carbonate and sodium sulfate. This invention, in brief, comprises a method for utilizing such kraft green liquor to produce a composite pigment of calcium carbonate and zinc sulfide while simultaneously converting the green liquor into the white liquor required for the pulping process.

Moreover, it has been found that by applying the process of this invention, important advantages are realized with respect to the precipitation of zinc sulfide. It has been found that by utilizing the process of this invention, a composite pigment is produced in which the inherent high hiding power of zinc sulfide is realized without the need for the involved and expensive steps of drying, calcining, and grinding heretofore used subsequent to precipitation. It has been further found, as will be made clear in the description, that when a composite calcium carbonate-zinc sulfide pigment is prepared by the process of this invention, the hiding power of the composite pigment is equal to or only slightly less than that of pure pigment zinc sulfide manufactured by conventional processes, even though the composite pigment contains only 20 to 30 percent ZnS with the remainder being CaCO₃. This is a discovery of great economic value when it is considered that a ton of pigment ZnS costs about $500, while it has been found that a ton of the composite pigment of equivalent hiding power can be manufactured for less than $100 by the process of this invention when integrated with the manufacture of bleached kraft pulp.

The advantages outlined above with respect to precipitation of zinc sulfide and to attainment of hiding power without the need for drying, calcining and grinding are equally realized whether kraft green liquor is used or some other solution containing an alkali metal sulfide and carbonate. It is therefore not meant to imply that the process of this invention is limited to kraft green liquor. However, by using existing facilities and process streams of a kraft pulp mill, cost savings are attained which may not be realized under other circumstances.

Zinc sulfide has long been known as a valuable pigment of excellent hiding power because of its high refractive index and bright white color. However, because of its extremely fine particle size when precipitated from solution, it is difficult to process. Separation and washing of the precipitate by the usual clarification and filtration means are slow and costly procedures. A further, very troublesome, difficulty encountered when zinc sulfide is precipitated from such an alkaline solution as sodium sulfide is the pronounced tendency of the precipitate to form as a hydrogel of indeterminate composition. Such a hydrogel when dried, undergoes syneresis and becomes a hard, glossy material which is worthless as a pigment. Moreover, even when the formation of a hydrogel is avoided by careful regulation of the concentration of reactants and rate of admixing, the precipitated zinc sulfide has always contained a considerable amount of chemically bound water, being often represented as $ZnS(H_2O)_x$. This product, after thorough washing, when dried at low temperature still retains its water and has relatively low hiding power and is of little value as a pigment. In order to produce a pigment of commercial value, it is necessary to dry the hydrated precipitate, then calcine it in an inert atmosphere at a moderately high temperature, about 500° C., and then suddenly cool, or quench, the calcined product. The quenched product is then finely ground to produce a pigment which has excellent qualities for use as a filler and in coatings. It is clear that these steps subsequent to precipitation present manufacturing difficulties and greatly increase the expense of making the pigment.

The present invention provides an economical and simple system for circumventing these difficulties by preparing from kraft green liquor, or a solution of similar composition, a co-precipitate of calcium carbonate and zinc sulfide. It has been discovered that by adding calcium hydroxide to the green liquor and simultaneously introducing a solution of a zinc salt, a new and novel composite precipitate of zinc sulfide and calcium carbonate results. It has been found that by employing conditions conducive to the formation of calcium carbonate of good settling and filtering characteristics, that these desirable properties are retained by the composite co-precipitate containing zinc sulfide. The composite co-precipitate settles rapidly and may be readily washed by decantation, or it is well adapted to separation from the mother liquor by filtration and washing on a filter.

Despite the highly alkaline nature of kraft green liquor, no difficulty has been experienced from formation of a zinc sulfide hydrogel even when a concentrated solution of a zinc salt was added rapidly to the green liquor, so long as the zinc sulfide content of the final composite coprecipitate did not exceed about 50%.

Furthermore, it has been found that the resulting pigment, containing only 20–30% ZnS, after separation and washing, without need for further treatment exhibits hiding power equal to or only slightly less than pure commercial pigment ZnS which has required drying, calcining, quenching and grinding as steps in its manufacture; and that the hiding power is definitely superior to intimate mixtures of commercial pigment ZnS with commercial coating grade CaCO₃, such mixtures prepared by ball milling the ZnS and CaCO₃, together for 48 hours. Comparative hiding powers are shown in the drawing, which is discussed later. Further, when the final composite pigment is dried at relatively low temperatures, 105° C., I have not found the presence of chemically bound water which, in part at least, is responsible for the need to calcine precipitated zinc sulfide.

During the formation of the composite pigment according to the invention, two essential chemical reactions are occurring simultaneously, one between the calcium hydroxide added and the sodium carbonate present in the green liquor, the other between a soluble zinc compound, such as zinc sulfate, and the sodium sulfide of the green liquor.

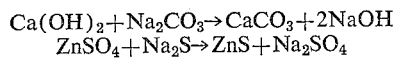

so long as the soluble zinc compound is not added in excess of that chemically equivalent to the sodium sulfide in the green liquor, no indication of the presence of zinc compounds other than the sulfide in the final product has been found.

I do not understand the mechanism by which zinc sulfide precipitated according to this invention fails to bond water molecules to itself, thereby requiring no calcining to develop good hiding power. It seems probable that the reactivity of the newly formed ZnS particles may be directed towards the newly formed $CaCO_3$ particles in the system, creating a type of pseudo chemical or physico-chemical bonding between the particles, in place of the bonding normally formed between ZnS and $H_2O$. Evidence has been found that some such bonding does exist. For example, when a dilute dispersion of a composite pigment prepared by the process of this invention is allowed to settle as in determination of particle size distribution by sedimentation methods, all particle size fractions have essentially the same chemical analysis. Further, centrifuging a dilute dispersion of the composite pigments does not effect a separation of ZnS and $CaCO_3$ even though their specific gravities are distinctly different.

In utilizing kraft green liquor, a somewhat brighter final product is obtained if $CaCO_3$ is produced first, removed from the system, washed, and bleached with small amounts of hypochlorite or peroxide and then returned to the system before precipitating zinc sulfide. It has been found that so long as the $CaCO_3$ is not dried nor allowed to age longer than about 24 hours, it retains much of its apparent affinity for freshly precipitated zinc sulfide and gives essentially the same synergistic effects as when zinc sulfide and calcium carbonate are produced simultaneously.

The advantages I have discovered for precipitating zinc sulfide in the presence of freshly precipitated, or nascent, calcium carbonate are not realized by adding a dry, relatively old $CaCO_3$ pigment to the system in which zinc sulfide is being precipitated. It has been recognized that addition of finely divided $CaCO_3$ during the precipitation of zince sulfide gives a product which settles and filters somewhat more readily than the pure zinc sulfide. However, the zinc sulfide thus precipitated, in direct contrast to the discovery of the behavior of freshly precipitated $CaCO_3$, contains water and must be calcined in order to develop its inherent hiding power.

For convenience, the term "composite" is used for the composite pigments produced by the process of this invention and the approximate percent ZnS in the pigment is indicated by a number following the term. Thus, composite-20 means a composite co-precipitated pigment containing about 20% ZnS and 80% $CaCO_3$.

The drawing shows a plot of hiding power versus pigment volume concentration of three pigments in accordance with ASTM D1738–60T. An easily dispersible, low viscosity hydroxyethyl cellulose was used as a binder. Hiding power at 20% PVC (pigment volume concentration) was determined using a Pfund Cryptometer, the ASTM method not being applicable at this low PVC.

The drawing shows the hiding power of (a) ZnS, a pure, commercial pigment zinc sulfide; (b) ZnS-20, a mixed pigment prepared by intimately mixing, by lengthy ball-milling, a commercial pigment zinc sulfide with a commercial, coating grade calcium carbonate in the proportions 20% ZnS, 80% $CaCO_3$; and (c) composite-20, a composite pigment prepared by the process of this invention from a typical kraft green liquor, and containing 20% ZnS, 80% $CaCO_3$. The superior hiding power of the composite pigment prepared by the process of our invention is clearly demonstrated.

In the manufacture of kraft pulp, the green liquor is normally clarified before the causticizing operation. For the preferred embodiment of this invention, it has been found that it is well to also filter that part of the green liquor which is used to manufacture the novel composite pigments. Inorganic or organic flocculating agents may also be used to advantage in producing a green liquor free from suspended solids before precipitating the calcium carbonate and zinc sulfide.

A distinctive feature of the kraft process is that the white liquor contains sodium sulfide as one of the cooking chemicals. The grams of sodium sulfide per liter of the white liquor divided by the sum of the grams per liter of sodium sulfide and sodium hydroxide (all quantities expressed as $Na_2O$), and the answer converted to percentage, is termed the sulfidity of the liquor. During the well known manufacturing steps of the kraft process, there are unavoidable losses of sulfur to the atmosphere and to the sewer. Since any given pulp mill prefers to operate within a fairly narrow specified range of sulfidity, it is common practice to introduce sodium sulfate (salt cake) into the recovery furnace, where it is reduced to $Na_2S$, in the proper quantity required to replace sulfur losses and hold the sulfidity within specifications.

When a composite pigment is manufactured by the process of this invention, sulfur will be removed from the system as zinc sulfide. In one embodiment of the invention, this sulfur is replaced by introducing into the recovery furnace a quantity of salt cake, over and above that required to replace normal operational losses, equivalent in sulfur to the zinc sulfide produced. However, it is clear that the sulfur removed from the system as zinc sulfide may be replaced by any method practical for a given pulp mill without affecting the generic concept of this invention.

With respect to the source of zinc, any soluble zinc compound may be employed. In the preferred embodiment zinc sulfate is used for several important reasons. By using zinc sulfate, no anions not normally found in white liquor are introduced. Also, it has been found that zinc sulfate solutions suitable for the process of the invention can be economically manufactured from scrap zinc or various low cost zinc ores and sulfuric acid. A final important advantage of using zinc sulfate is that the $Na_2SO_4$ produced during the precipitation of zinc sulfide

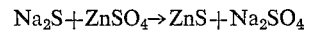

remains in the system and is converted to $Na_2S$ in the recovery furnace. When the sulfur of the $ZnSO_4$ comes from a source which would not otherwise be introduced into the system, it is then unnecessary to make the extra addition of salt cake described in the above paragraph because the sulfur added to the system as $ZnSO_4$ is equivalent to that removed as ZnS.

The method and manner in which the process streams of a kraft pulp mill are diverted and utilized in the production of the composite pigments do not alter the concept of this invention. For instance, as an alternate procedure green liquor can be causticized as usual and then freshly precipitated nascent $CaCO_3$ from any convenient source introduced into the white liquor, and ZnS precipitated from white liquor in the presence of the nascent $CaCO_3$. It is not intended that the details of operation are limited to those specifically mentioned.

With respect to the lime utilized in producing the composite pigments, we prefer to use a calcium hydroxide rather than adding quick lime directly to the green liquor as is normally done when the only objective is to causticize the green liquor. It has been found that either a high quality chemical grade dry lime hydrate or a lime slurry can be employed satisfactorily. Generally a dry hydrate produces a pigment of larger particle size than does a lime slurry.

When the novel composite pigments are produced by a kraft pulp mill for use in an integrated paper mill, the pigment need not be dried prior to use either as a filler or as a component of paper coating formulations. For other uses, such as in paints, it will be necessary to dry the composite pigment. The following examples illustrate the preparation of typical composite pigments and their applications as fillers in paper, in paper coating, and in paint formulation. Such uses are illustrative and not limiting.

Example 1

A composite-20 pigment was produced by the process of the invention from a typical kraft green liquor as follows. Clarified green liquor was filtered and analyzed and found to contain 79.4 g./l. of $Na_2CO_3$; 20.4 g./l. of $Na_2S$; and 21.5 g./l. of $NaOH$ (all expressed as $Na_2O$). A lime slurry was prepared from a high calcium, high quality chemical quick lime by slaking 1000 g. of the CaO in 5000 g. of $H_2O$. The resulting slurry was screened through a 200 mesh screen, allowed to settle overnight, all excess water siphoned off, the slurry analyzed for $Ca(OH)_2$ and found to contain 220 g. of $Ca(OH)_2$ per 1000 g. of slurry.

860 g. of the lime slurry, containing 189 g. of $$Ca(OH)_2$$

were filtered using a vacuum filter. The filter cake was added to 2 l. of green liquor at 25° C., thoroughly dispersed and allowed to react for 1 hour with constant stirring. The resulting mixture was filtered using a vacuum filter, the white liquor filtrate was set aside, the filter cake of $CaCO_3$ was washed with 2 l. of water and then dispersed in water giving a slurry of about 30% solids. Calcium hypochlorite solution was added to the $CaCO_3$ slurry giving 0.5% available chlorine based on the weight of $CaCO_3$ present. After 30 minutes, the bleached $CaCO_3$ was filtered using a vacuum filter, the filtrate discarded and the $CaCO_3$ filter cake returned to the white liquor and thoroughly dispersed. To the dispersion of the freshly precipitated, bleached $CaCO_3$ in the white liquor, 530 ml. of zinc sulfate solution (200 g./l. $ZnSO_4$) were added with constant stirring. The zinc sulfate solution was added gradually over a period of 10 minutes and the mixture was stirred for 20 minutes after completion of addition of the zinc sulfate. The mixture was filtered using a vacuum filter and the filter cake was washed with 2 l. of water. The final composite was dispersed in water and screened through a 200 mesh stainless steel screen. A portion of the composite pigment was dried for analysis.

Brightness of this composite-20 was 97 at 450 mu; hiding power at 20% PVC was 75 cm.²/g. as determined by a Pfund Cryptometer. Analysis of the dried pigment showed 19.5% ZnS, 80.0% $CaCO_3$.

Example 2

A composite-30 pigment was prepared by the process of this invention using the same green liquor as in Example 1.

Two liters of the green liquor were heated to 70° C. and 120 g. of dry lime hydrate, 95% $Ca(OH)_2$, were added substantially all at once. The hydrate was thoroughly dispersed and, with constant agitation, 530 ml. of zinc sulfate solution (200 g./l. $ZnSO_4$) were added gradually over a 10 minute period. The mixture was then held at 70° C. for 60 minutes with constant stirring. The mixture was filtered using a vacuum filter, the filter cake was washed with 2 l. of water and then dispersed in water and screened through a 200 mesh stainless steel screen. After screening, the pigment slurry was allowed to settle for 1 hour, the excess water siphoned off, and calcium hypochlorite solution added to the slurry to give 1% available chlorine based on the weight of $CaCO_3$ present. After 30 minutes, 30% hydrogen peroxide was added to give 0.5% $H_2O_2$ based on the weight of ZnS present. After 30 minutes, a sample of the final pigment was dried for analysis.

Brightness of this composite-30 pigment was 92 at 450 mu; hiding power at 20% PVC was 80 cm.²/g. as determined by a Pfund Cryptometer. Analysis of the dried pigment showed 30.8% ZnS, 68.7% $CaCO_3$.

Example 3

A typical paper coating formulation incorporating a composite-30 pigment was prepared as follows employing conventional techniques for coating preparation:

| Ingredient: | Parts by weight |
| --- | --- |
| Coating clay | 67 |
| Composite-30 | 33 |
| Hexamethaphosphate dispersant | 0.5 |
| Starch solution 20% | 46.5 |
| Modified styrene-butadiene latex, 48% solids [1] | 39 |
| Water | 47.5 |

[1] Such as Dylex K-55, Koppers Co., Pittsburgh, Pa.

This coating, 55% solids, 60% PVC, had a Brookfield viscosity of 1100 cps. at 60 r.p.m. Visual comparisons over standard black and white background charts showed marked superiority in hiding power of the composite-30 coating over a similar formulation prepared using conventional ZnS and $CaCO_3$.

Example 4

White book paper containing only a composite pigment as a filler was prepared by adding a composite-20 pigment slurry to a beater charged with 50% long fiber, 50% short fiber. The composite-20 slurry was added at the start of the beating time and the pulp was beaten to a 25° Schopper-Riegler freeness. The paper was sized by well established neutral sizing techniques using 0.2% Aquapel-360, based on dry weight of fiber. 50 lb. basis weight paper giving 10% ash was made and found to have opacity of 92 at a brightness of 82. Degree of sizing as measured by the ink flotation test, was in excess of 300 seconds.

Example 5

A typical formulation for a white exterior house paint incorporating a composite pigment is as follows—

| Ingredient: | Parts by weight |
| --- | --- |
| Titanium dioxide | 4.4 |
| Composite-20 | 39.2 |
| Alkali refined linseed oil | 18.0 |
| Bodied linseed oil X viscosity | 55.0 |
| Mineral spirits | 66.0 |
| Lead naphthenate (24% Pb) | 0.65 |
| Manganese naphthenate (6% Mn) | 0.08 |

A paint of this formulation has excellent hiding power and closely resembles a similar paint containing zinc sulfide weight for weight in place of the composite-20 pigment.

I claim:

1. A composite white pigment of improved hiding power as compared to pure zinc sulfide consisting essentially of the precipitate obtained by precipitating zinc sulfide in the presence of freshly precipitated, nascent calcium carbonate in which the amount of zinc sulfide is about 20 to about 30 weight percent of the total precipitate.

2. A composite white pigment of improved hiding power as compared to pure zinc sulfide consisting essentially of the precipitate obtained by simultaneously co-precipitating zinc sulfide and calcium carbonate in which the amount of zinc sulfide is about 20 weight percent to about 50 weight percent of the total precipitate.

3. A process for preparing a composite pigment of improved hiding power and containing calcium carbonate and zinc sulfide comprising the steps of adding to a solution containing alkali metal carbonate and alkali metal sulfide, a compound capable of providing Ca++ ion in a quantity not in excess of that chemically equivalent to the amount of alkali metal carbonate in said solution and not less than that required to yield, on reaction with said alkali metal carbonate, calcium carbonate amounting to about 50 weight percent of the composite pigment; adding to said solution a compound capable of providing Zn++ ions in a quantity not in excess of that chemically equivalent to the amount of alkali metal sulfide present therein nor larger than that required to yield, on reaction with said alkali metal sulfide, zinc sulfide amounting to about 50 weight percent of the composite pigment; and recovering the resulting composite pigment.

4. The process of claim 3 in which said solution contains sodium carbonate and sodium sulfide.

5. The process of claim 3 in which said solution is kraft green liquor.

6. A process for preparing a composite pigment of improved hiding power and containing calcium carbonate and zinc sulfide comprising the steps of adding to a solution containing sodium carbonate and sodium sulfide, calcium hydroxide in a quantity not in excess of that chemically equivalent to the amount of sodium carbonate in said solution and not less than that required to yield, on reaction with said sodium carbonate, calcium carbonate amounting to about 50 weight percent of the composite pigment; while the reaction between calcium hydroxide and sodium carbonate is taking place, adding to said solution a zinc compound in a quantity not in excess of that chemically equivalent to the amount of sodium sulfide present therein nor larger than that required to yield, on reaction with said sodium sulfide, zinc sulfide amounting to about 50 weight percent of the composite pigment; permitting the precipitation of the composite pigment containing zinc sulfide and calcium carbonate; and separating said pigment from the liquid phase.

7. The process of claim 6 in which the sodium carbonate-sodium sulfide solution is kraft green liquor.

8. The process of claim 6 wherein said zinc compound is zinc sulfate.

9. A process for preparing a composite pigment of improved hiding power and containing calcium carbonate and zinc sulfide comprising the steps of introducing into a solution containing sodium sulfide freshly precipitated nascent calcium carbonate in an amount equal to at least about 50 weight percent of the composite pigment; introducing into said solution of zinc compound so as to form zinc sulfide in an amount of about 20 weight percent to about 50 weight percent of the composite pigment from said sodium sulfide; permitting the precipitation of the composite pigment containing zinc sulfide and calcium carbonate; and separating said composite pigment.

10. The process of claim 9 in which the sulfide containing solution is kraft green or white liquor.

11. The process of claim 9 wherein said zinc compound is zinc sulfate.

References Cited
UNITED STATES PATENTS

| | | | |
|---|---|---|---|
| 1,886,165 | 11/1932 | Christensen | 106—293 |
| 2,263,656 | 11/1941 | Stutz | 106—293 |

TOBIAS E. LEVOW, *Primary Examiner.*

J. E. POER, *Assistant Examiner.*